United States Patent [19]
Racky et al.

[11] 3,894,986
[45] July 15, 1975

[54] FLAME RESISTANT THERMOPLASTIC POLYESTERS

[75] Inventors: Werner Racky, Wiesbaden; Walter Herwig, Neuenhain, Taunus; Hans-Jerg Kleiner, Bad Soden, Taunus, all of Germany

[73] Assignee: Hoechst Aktiengesellschaft, Frankfurt am Main, Germany

[22] Filed: Oct. 23, 1973

[21] Appl. No.: 408,646

[30] Foreign Application Priority Data
Oct. 25, 1972  Germany............................ 2252210

[52] U.S. Cl. ............................................ 260/45.7 P
[51] Int. Cl. ............................................ C08g 51/62
[58] Field of Search... 260/45.7 P, 502.4 R, 502.4 P

[56] References Cited
UNITED STATES PATENTS

| | | | |
|---|---|---|---|
| 3,463,835 | 8/1969 | Budnick | 260/45.7 |
| 3,471,552 | 10/1969 | Budnick | 260/45.7 |
| 3,474,047 | 10/1969 | Pelletier et al. | 260/45.7 |
| 3,522,204 | 7/1970 | Savides | 260/45.7 |
| 3,576,793 | 4/1971 | Carroll et al. | 260/45.7 |
| 3,664,975 | 5/1972 | Kerst | 2600/45.7 |
| 3,751,396 | 8/1973 | Gall | 260/45.7 |

Primary Examiner—V. P. Hoke
Attorney, Agent, or Firm—Curtis, Morris & Safford

[57] ABSTRACT

Flame resistant thermoplastic polyesters, which contain alkali salts of phosphonic acids.

6 Claims, No Drawings

FLAME RESISTANT THERMOPLASTIC POLYESTERS

The present invention relates to flame resistant thermoplastic polymers.

It is known that additives of red phosphorus or carbon compounds of phosphorus to thermoplasts can influence the burning behaviour of the polymers and produce good fire-proofing under certain circumstances.

The difficulty when using phosphoric organic compounds for flame-proof finishing of saturated polyesters is that these compounds often have too low a stability under the preparation and processing conditions necessary for the saturated polyesters, they are sometimes not sufficiently inert from the chemical point of view or have too high a vapor pressure and, therefore, volatilize when the polyester is subjected to the effect of heat, above all under reduced pressure.

It has now been found that linear, saturated polyesters which contain alkali salts of phosphonic acids of the general formula

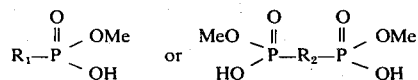

wherein $R_1$ represents a saturated, open chained, optionally branched or cyclic alkyl radical or an aryl radical or an arylalkylene radical, having from 1 to 16 carbon atoms, preferably an alkyl radical, having from 1 to 6 carbon atoms, $R_2$ represents a saturated, open-chained, optionally branched or cyclic alkylene radical, arylene radical or arylene-alkylene radical, having up to 6 carbon atoms in the alkylene radical, preferably having from 2 to 4 carbon atoms in the alkylene radical, and Me represents an alkali metal, preferably sodium, exhibit excellent fire-proofing and can be prepared without the above mentioned difficulties.

The phosphorus compounds are thermally stable, they neither decompose saturated polyesters in the processing nor do they influence the preparation of such thermoplasts. Because of the salt-like character they are not volatile under the preparation and processing conditions for polyesters.

The alkali salts of the phosphonic acids, which are contained or incorporated in the polyester of the invention include, for example: ethane, propane, butane, hexane, octane, cyclohexane, benzene, and benzylphosphonic acid mono-sodium-salt, as well as the dialkali salts of the ethane-1,2-diphosphonic acid and the 1,4-phenylene-diphosphonic acid. The sodium salts of the phosphonic acids are preferred.

The concentration of the phosphonic acid alkali salts of the invention is, depending on the flame-protection requirement, between 5.5 and 35 percent by weight, preferably 6 to 30 % by weight, calculated on the weight of the polymers.

As linear saturated polyesters the moulding composition should preferably contain polyalkylene terephthalate, especially polyethylene terephthalate.

Instead of polyalkylene terephthalate modified polyalkyleneterephthalates can also be used, which contain, as well as terephthalic acid, also other aromatic or aliphatic dicarboxylic acids as acid components, for example isophthalic acid, naphthalene-2,6-dicarboxylic acid or adipic acid. Furthermore, modified polyalkylene-terephthalates can be used which contain, in addition to propanediol, butane-diol-1,4 or ethylene-glycol, as alcohol component other diols, for example 1,4-dimethylolcyclohexane or neopentylglycol. The quantity of modifying acid or diol components should not exceed approximately 10 % in moles, calculated on the total quantity of dicarboxylic acid or diol.

The polyester part of the moulding composition has a reduced specific viscosity dl/g (measured on a 1 % solution in phenol/tetrachloroethane 60:40 at 25°) of from 0.5 to 2.0 dl/g, preferably from 0.6 to 1.6.

Also polyesters with lower reduced specific viscosity can be prepared at first and the desired viscosity obtained by subsequent condensation optionally in the solid phase.

The preparation, for example, of the polyethylene terephthalate is carried out according to known processes. Preferably, a low dialkyl-ester of the terephthalic acid, for example dimethylester, is used as starting material and this is transesterified with an excess of glycol in the presence of suitable catalysts to the bis-hydroxy-ethyl-ester of the terephthalic acid. The temperature is thereafter increased from 140°C to 210°C to 220°C. The aliphatic alcohol set free is distilled off. For the polycondensation which is carried out at a temperature of from 210°C to 280°C, the pressure is reduced in stages to a value of below 1 mm Hg.

A particular advantage is that the phosphoric compounds neither influence the preparation nor the processing of the condensates unfavourably.

If diglycol-terephthalate is subjected, for example, in the presence of ethane-phosphonic acid mono-sodium salt to a catalytic melt condensation this is not influenced by the foreign additive. The resulting polyester is colourless, has the molecular weight expected, can be subsequently condensed in the solid phase and injection moulded on the usual processing machines. It is surprising, for example, that ethane phosphonic acid mono-sodium-salt does not decompose when incorporated in thermoplastic polyesters.

The addition of the phosphoric compounds at the beginning of the transesterification or melt condensation is not obligatory, they can be introduced at any arbitrary point of the process.

Likewise, it is possible to mix the flame retarding additives with a finished polyester granulate and to process this mixture directly, for example on injection moulding machines, or melt it first in an extruder, granulate and after drying, process into moulded articles.

The flame retarding effect of the compounds added was tested according to ASTM D 635-68 on bars measuring 127 × 12.7 × 1.3 mm. According to the process of the invention polyesters are obtained which are self extinguishing or non-combustible. For example, a good fire proofing of polyethylene-terephthalate is obtained even with a content of 9 % ethane-phosphonic acid mono-sodium salt.

In addition to the phosphonic acid derivatives inorganic fibre materials can be added to the reaction mixture in the usual quantities, for example, glass fibres, but also fibres of quartz, asbestos or carbon can be used.

The thickness especially of the glass fibres is from 0.1 to 50 microns, preferably from 3 to 15 microns, their length is from 0.01 to 5 mm, preferably from 0.05 to 1 mm. The quantity of the fibres is up to 50 % by weight, preferably from 10 to 30 % by weight, calculated on the moulding composition.

Furthermore, the moulding compositions can contain, in addition, other known additives, such as stabilizers, mould release agents, dyestuffs, fillers, nucleating agents and compounds acting antistatically.

The fire proof polyesters of the invention are suitable for the preparation of moulded articles, for example by press moulding, injection moulding or extrusion. In the case of the injection moulding of polyethyleneterephthalate it is advantageous to heat the mould to a temperature of from 20°C to 160°C, preferably from 100°C to 150°C, since then the polyester portion of the moulding composition crystallizes with the aid of a nucleating agent to a degree which guarantees a high stiffness and hardness of the moulded articles. The moulded articles are further distinguished by low shrinkage and high dimensional stability.

The fire proof polyester moulding compositions are used in the preparation of casings, structural parts for the electrical industry, mechanical transmission parts in automatic machines, hollow articles, structural units in computer equipment and sensitive electronic apparatus. They are suitable for the preparation of fibres, filaments and sheets.

The following examples illustrate the invention.

EXAMPLE 1

(Comparative example)

Polyethylene terephthalate was press moulded in ground form between 200°C and 240°C and at pressures of from 5 to 100 atmospheres into plates from which testing bars were cut with the measurements 127 × 12.7 × 1.3 mm. The flammability was tested according to ASTM D 635-68 on these testing bodies. The values are given in table 1.

EXAMPLE 2

A mixture of 1,000 parts by weight of dimethyl-terephthalate, 800 parts by weight of ethylene glycol, 0.31 parts by weight of manganese acetate was gradually brought to 225°C while stirring, methanol was distilled off over a column until the conclusion of the transesterification. By raising the temperature to 270°C the excess of ethylene glycol was expelled. After adding 100 parts by weight of ethane-phosphonic acid mono-sodium-salt and 0.4 parts by weight of germanium-phosphite the polycondensation was carried out by raising the temperature to 280°C at a final pressure of 0.6 mm Hg. The finished polyester had a relative specific viscosity of 0.83 dl/g. After being removed from the condensation vessel the polyester filament was granulated and the granulate was brought by solid condensation at 240°C and 0.5 mm Hg in 5 ½ hours to a reduced specific viscosity of 1.39 dl/g, and, as mentioned above, prepared for the flame test according to ASTM D 635-68.

EXAMPLE 3

Polyethylene terephthalate was mixed homogeneously in ground form with the fire retarding agent hexane-phosphonic acid mono-sodium-salt and subsequently press moulded between 200°C and 240°C and pressures of from 5 to 100 atmospheres to plates, from which testing bars with the measurements 127 × 12.7 × 1.3 mm were cut. The combustibility was tested on these testing bodies according to ASTM D 635-68. The values are given in table 1.

| Example | Polyester | Additive | weight-% additive | RSV dl/g | Estimation according to ASTM D 635–68 |
|---|---|---|---|---|---|
| 1 | Polyethylene terephthalate | — | — | 0.85 | combustible |
| 2 | Polyethylene terephthalate | $CH_3-CH_2-P(=O)(OH)(ONa)$ | 9 | 0.83 | non-combustible |
| 3 | Polyethylene terephthalate | $C_6H_{13}-P(=O)(OH)(ONa)$ | 15 | 0.77 | self-extinguishing |

What is claimed is:

1. A flame-resisting thermoplastic polyester composition comprising a mixture of polyalkylene terephthalate which may contain up to 10 mole percent, based on the total dicarboxylic acid and diol units in said polyester, of units derived from a dicarboxylic acid other than terephthalic acid, and up to 10 mole percent of units derived from a diol other than an alkylene diol, and a flame-retarding amount of an alkali salt of phosphonic acids of the general formula

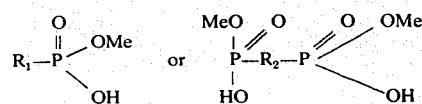

wherein $R_1$ represents a saturated, open chained, optionally branched or cyclic alkyl radical, aryl radical or arylalkylene radical, having from 1 to 16 carbon atoms, $R_2$ represents alkylene of 1 to 6 carbon atoms or phenylene, and Me represents an alkali metal.

2. A polyester as claimed in claim 1, wherein the concentration of the alkali salts is between 5.5 and 35 parts by weight, calculated on the weight of the polymer.

3. A polyester as claimed in claim 1 wherein polyalkylene terephthalate has a reduced specific viscosity of between 0.5 and 2.0.

4. A polyester as claimed in claim 1 wherein the polyesters contain fillers.

5. Injection molded, compression molded and extrusion molded articles molded from the polyester composition of claim 1.

6. Sheets, fibers and filaments molded from the polyester composition of claim 1.

* * * * *